(12) United States Patent
Pintauro

(10) Patent No.: US 8,480,054 B2
(45) Date of Patent: Jul. 9, 2013

(54) TORTIONALLY STIFF, THERMALLY ISOLATING SHAFT COUPLING WITH MULTIPLE DEGREES OF FREEDOM TO ACCOMMODATE MISALIGNMENT

(75) Inventor: Arthur C. Pintauro, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 1091 days.

(21) Appl. No.: 12/130,276

(22) Filed: May 30, 2008

(65) Prior Publication Data

US 2009/0293654 A1  Dec. 3, 2009

(51) Int. Cl.
*F16K 31/44* (2006.01)

(52) U.S. Cl.
USPC ......... 251/77; 251/129.11; 251/305; 464/134

(58) Field of Classification Search
USPC .................. 251/77, 129.11, 129.12, 129.13, 251/305; 403/166, 359.4, 150–159; 464/134, 464/169, 182
See application file for complete search history.

(56) References Cited

U.S. PATENT DOCUMENTS

| | | | |
|---|---|---|---|
| 2,305,594 A | 12/1942 | Backus | |
| 2,753,147 A | 7/1956 | Welge | |
| 2,899,808 A * | 8/1959 | Berens | 464/73 |
| 4,380,246 A | 4/1983 | Casale et al. | |
| 4,819,696 A | 4/1989 | Takikawa et al. | |
| 5,085,401 A | 2/1992 | Botting et al. | |
| 5,148,678 A | 9/1992 | Ueda et al. | |
| 5,564,461 A | 10/1996 | Raymond, Jr. et al. | |
| 5,638,926 A | 6/1997 | McCrickard | |
| 5,738,072 A | 4/1998 | Bolte et al. | |
| 5,913,329 A | 6/1999 | Haynes et al. | |
| 6,079,210 A | 6/2000 | Pintauro et al. | |
| 2004/0155216 A1 | 8/2004 | McCarty | |
| 2005/0085304 A1* | 4/2005 | Duggan | 464/92 |
| 2005/0282641 A1* | 12/2005 | Sadakata et al. | 464/134 |
| 2008/0017815 A1* | 1/2008 | Callahan et al. | 251/77 |
| 2008/0017816 A1* | 1/2008 | Willats et al. | 251/77 |

FOREIGN PATENT DOCUMENTS

| | | |
|---|---|---|
| DE | 2101023 A1 | 9/1972 |
| DE | 2656257 A1 | 6/1978 |
| FR | 2096087 A5 | 2/1972 |
| GB | 1025741 | 4/1966 |
| JP | 7139658 A | 5/1995 |
| JP | 9004644 A | 1/1997 |
| JP | 9196228 A | 7/1997 |
| JP | 2005069319 A | 3/2005 |
| JP | 3819882 B2 | 9/2006 |

* cited by examiner

*Primary Examiner* — Eric Keasel
*Assistant Examiner* — Ian Paquette
(74) *Attorney, Agent, or Firm* — Reinhart Boerner Van Deuren P.C.

(57) ABSTRACT

A coupling arrangement coupling and thermally isolating a continuously variable electrical actuator rotationally coupled to and from a butterfly valve is provided. The valve may be used to modulate high temperature exhaust gas flow through an engine turbocharger. The actuator provides a continuously variable control of the valve. The coupling arrangement provides a thermal block to reduce heat transfer and vibration insulation between the actuator and the valve. The coupling arrangement generally includes a coupling shaft rotationally coupled at opposite ends to the input and output shafts by torsion spring mechanisms. The torsion spring mechanisms include yokes rotationally locking the coupling shaft to the input and output shafts. The torsion spring mechanisms allow a limited range of axial and pivotal translation between the coupling shaft and the input and output shafts and are preloaded to prevent rotational hysteresis in the valve.

15 Claims, 8 Drawing Sheets

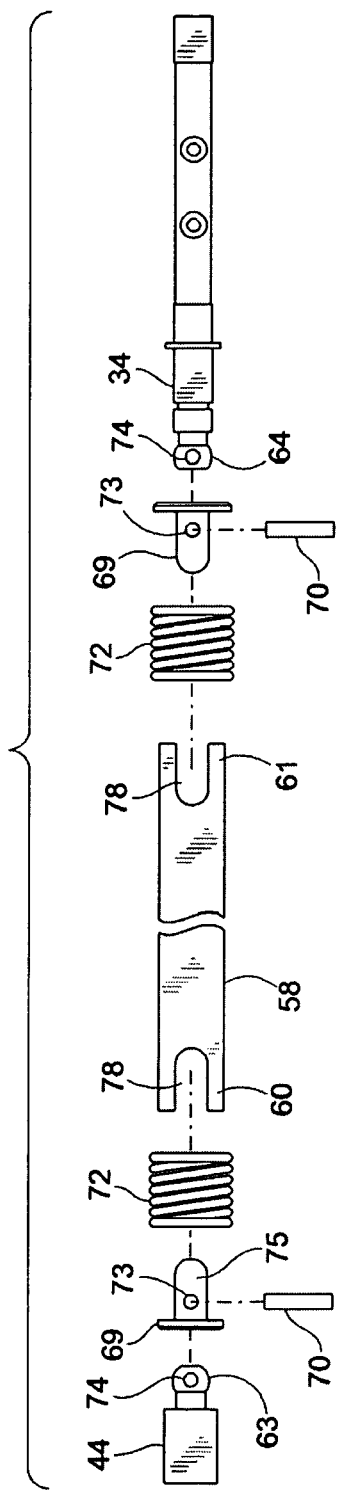
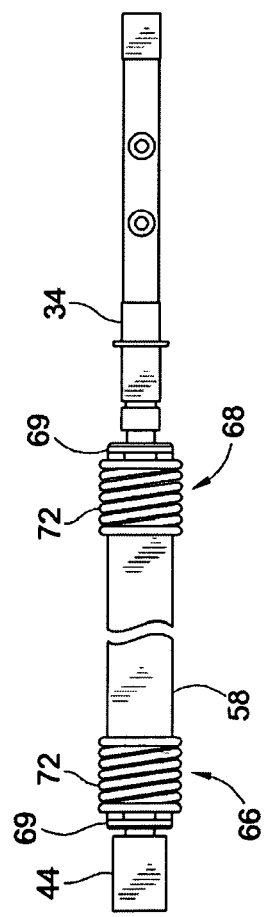
FIG. 4
FIG. 5

TORTIONALLY STIFF, THERMALLY ISOLATING SHAFT COUPLING WITH MULTIPLE DEGREES OF FREEDOM TO ACCOMMODATE MISALIGNMENT

FIELD OF THE INVENTION

This invention relates generally to flow control valves and more particularly to continuously variable butterfly valves for applications in engines.

BACKGROUND OF THE INVENTION

There are a number of high temperature applications where fast and accurate control over fluid flow is needed. One exemplary and very significant application is controlling the boost pressure provided by a turbocharger. Turbochargers affect the air fuel (A/F) ratio combusted in the cylinders of modern internal combustion engines, which includes diesel and natural gas engines. Turbochargers include a compressor for compressing air and a turbine for driving the compressor. The turbine operates off of the exhaust flow exiting the engine. To achieve the most efficient engine performance, the boost pressure of the air delivered into the cylinders must be accurately controlled.

One way to obtain better control over the compressor boost pressure is to control the amount of exhaust flowing through the turbine. This can be done by providing a controlled wastegate valve which closely regulates or modulates the amount of exhaust flowing through the turbine. Design of the controlled wastegate valve must take into consideration the harsh environment in which the valve operates. The wastegate valve may be subjected to exhaust gas temperatures of up to 1400° F. Being in close proximity to the combustion chambers, the wastegate valve also must handle the vibration and heat transfer coming from the engine block.

There are known prior attempts of regulating the exhaust flow through the turbines of turbochargers using pneumatically controlled flow control valves. A typical prior attempt includes the use of a pneumatic actuator for controlling the position of a swing valve or poppet valve. The swing or poppet valve regulates the flow of exhaust through an exhaust bypass in the engine turbocharger. While, pneumatic actuators can be configured to withstand the high temperature environment, they provide a slow response with a significant amount of rotational hysteresis resulting from pressure differentials between the valve and the pneumatic actuator. Furthermore, swing and poppet valves have very high gain characteristics, making precise control impracticable. These factors cause deficient control of the turbo boost pressure. This results in inefficient control of the engine turbocharger and lower efficiency for the combustion engine.

In cool temperature applications, such as throttling ambient temperature air into an engine, there are known electrically actuated butterfly valves. Such electrically actuated butterfly valves typically have a single solid shaft which transfers the rotational output of an electrical actuator to the butterfly valve. These electrical actuators are highly responsive which provides fast and accurate control of the butterfly valve and the low temperature gas which flows therethrough. However, the shaft is an excellent conductor of heat and vibration which would cause overheating and/or failure of the electrical actuator if applied to high temperature applications, such as a wastegate flow control valve for regulating exhaust flow to a turbocharger for example.

There are also known attempts at providing electrically actuated butterfly valves for exhaust braking. For example, U.S. Pat. No. 2,753,147, to Welge, illustrates an electrically actuated on/off butterfly valve for building backpressure against the engine pistons to slow the vehicle when the vehicle is traveling down a steep slope. However, the engine braking valve in Welge would not be suitable for controlling turbo boost pressure in an engine. Welge discloses an on/off type valve that is not continuously variable. Such on/off type valves do not provide the control, responsiveness or accuracy necessary for the desired control of turbo boost pressure. Furthermore, the output shaft of the electrical actuator is disposed along a separate axis spaced parallel to the input shaft of the butterfly valve. Rotation is transferred from the output shaft to the input shaft by a spring, roller and track mechanism which causes the input and output shafts to rotate in opposite directions. This connection between input and output shaft increases the complexity of the valve and allows rotational play between shafts which in turn would decrease the responsiveness and control of the butterfly valve.

Yet, another problem with Welge is that it does not appear to be adapted for the harsher environmental conditions necessary for controlling exhaust flow through an engine turbocharger. In Welge, the butterfly valve is adapted to be mounted between the outlet of the exhaust manifold and the inlet of the exhaust line, which can be further downstream from the engine combustion chamber as compared with the typical location of the bypass in an engine turbocharger. This downstream location is a less harsh environment in terms of temperature and vibration as compared with a typical turbocharger bypass. And therefore it does not suffer from the problems to which the instant invention is directed.

The invention provides improvements over the current state of the art.

BRIEF SUMMARY OF THE INVENTION

The present invention has several aspects and features that are individually patentable and/or patentable together in one or more embodiments.

It is therefore a feature of an embodiment of the present invention to provide an electrically actuated flow control valve for accurate control of fluid flow in high temperature applications. According to this feature, an electrical actuator includes an output shaft that has a rotary position proportionally related to electric signals applied to the electrical actuator. The flow control valve includes an input shaft coupled to a movable valve member to regulate fluid flow through a fluid passage. The input shaft and output shaft are preferably or substantially coaxially aligned and rotationally coupled by a coupling tube for direct transfer of rotary movement from the electrical actuator to the flow control valve. The coupling tube serves as a thermal block between the input and output shafts. Coupling means joins the coupling tube to the respective input and output shafts restricting heat transfer therethrough.

In another embodiment of the present invention, the connection between input and output shafts allows for angular and axial translation therebetween. This allows for small angular and axial displacements and misalignments between the electrical actuator and the butterfly valve, which can be caused by thermal expansion or contraction and vibrations between the butterfly valve and the electrical actuator as well as misalignments during assembly.

In another embodiment of the present invention, torsion spring mechanisms rotationally couple the intermediate coupling tube to the input and output shafts. The torsion spring mechanisms have axial and angular flexibility to allow angular and axial translations. In accordance with a specific embodiment, the torsion spring mechanisms are preloaded to provide a rotational spring force or torque greater than that which the electrical actuator or butterfly valve will exert during normal operation to eliminate substantially all rotational hysteresis and backlash between the input and output shafts. In further embodiments, the torsion spring mechanisms include yokes that angularly interlock with the coupling tube. In effectuating these embodiments, the tangs and tube may include an interlocking slot and tang arrangement to transfer torques between the yokes and the coupling tube.

In a further embodiment of the present invention, a drive arrangement for translating rotary movement from an actuator apparatus to a valve member is provided. The drive arrangement includes input and output shafts, first and second yokes and coupling shaft. The input shaft has a rounded first end portion. The output shaft has a rounded second end portion. The first yoke includes an axially extending first tang torsionally secured to the first end portion. The second yoke includes an axially extending second tang torsionally secured to the second end portion. The coupling shaft includes a first slot formed in a first end slidably receiving the first tang torsionally coupling the coupling shaft to the first yoke. The coupling shaft includes a second slot formed in a second end slidably receiving the second tang torsionally coupling the coupling shaft to the second yoke.

In a preferred implementation of the previous embodiment, the first and second end portions are rounded to reduce contact area to a line contact between the inside of the coupling shaft and the oursurface fo the first and second end portions.

In a further embodiment of the present invention, a coupling arrangement for coupling an actuator with a flow control valve and providing thermal barriers therebetween is provided. The coupling arrangement includes a yoke and a coupling shaft. The yoke includes first and second axially extending tangs axially extending from a head portion and angularly coupled to one another by the head portion. The coupling shaft includes first and second axially aligned and angularly spaced slots. The first slot slidably receiving the first tang and the second slot slidably receiving the second tang. The coupling shaft has a degree of rotational movement and a degree of axial movement relative to the yoke.

These and other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is an exploded simplified view of the drive arrangement of the assembly of FIG. 2.

FIG. 5 is an assembled illustration of the drive arrangement of FIG. 4.

Figure 1:
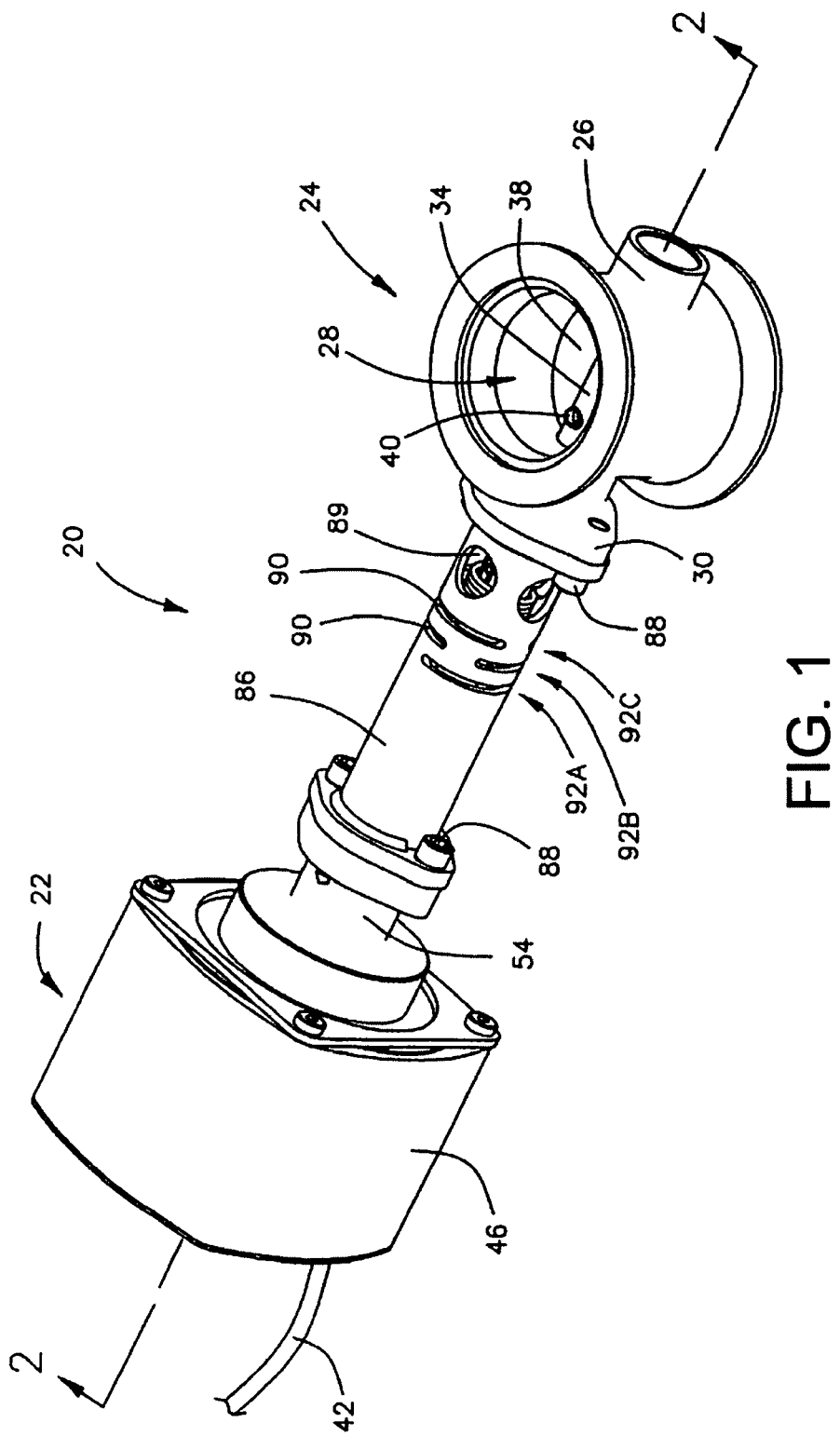
FIG. 1 is a perspective view of an electrically controlled butterfly valve according to a preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration and referring to FIG. 1, a preferred embodiment of the present invention has been depicted as an electrically controlled butterfly valve apparatus 20 for high temperature applications. Although the preferred embodiment will be described as particularly adapted for controlling exhaust gas flow which may have a temperature of up to about 1400° F., it should be understood from the outset that the preferred embodiment may be adapted for controlling fluid flow in other high temperature engine applications and/or in association with other applications that need thermal isolation between a valve and an electrical actuator. These broader aspects are considered to be part of the present invention, and are covered by certain of the broader claims appended hereto.

Figure 2:
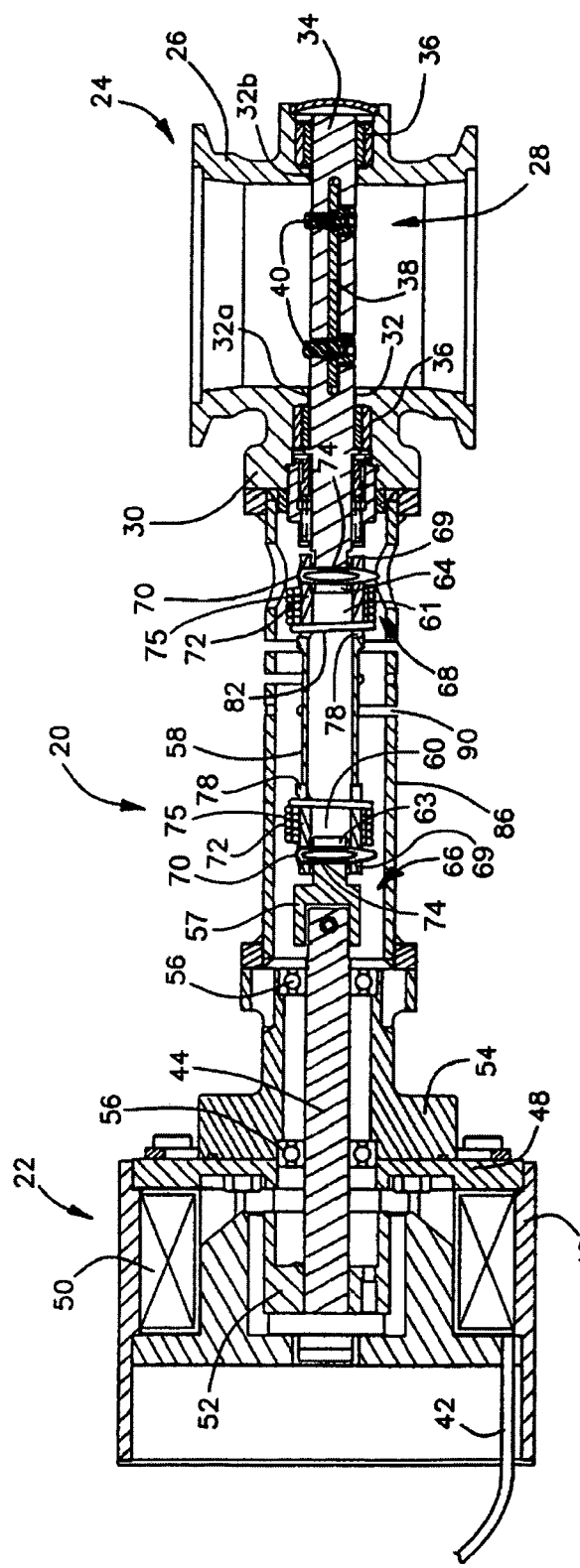
FIG. 2 is a cross-sectional view taken about line 2-2 of the electrically controlled butterfly valve of FIG. 1.

To achieve better control of fluid flow in high temperature applications, the preferred embodiment of the present invention generally includes an electrical actuator 22 that has a continuously variable output for varying the rotary position of a butterfly valve 24 or other suitable flow control valve. The butterfly valve 24 includes a generally cylindrical valve body 26, which can be stainless steel or other suitable material, that defines a cylindrical fluid passage 28 or other suitable annular shaped passage for passing high temperature exhaust gas. As used herein, the term annular is meant to include elliptical, oval, circular and any other acceptable curve shape. Referring now to FIG. 2, the valve body 26 includes a drive receiving/mounting portion 30 that extends generally perpendicular to the fluid passage 28. Extending across the valve body 26 and through the drive receiving portion is a cylindrical bore 32, which extends perpendicularly across the fluid passage 28 to include diametrically opposed portions 32a, 32b.

A solid input shaft 34 is mounted in the bore 32 for rotation relative to the valve body 26. The input shaft 34 extends through both diametrically opposed bore portions 32a, 32b and projects out from the drive mounting/receiving portion 30 for receiving the continuously variable rotational output from the electrical actuator 22. The input shaft 34 is journalled between a pair of heat resistant carbon bearings 36 so that the input shaft 34 rotates freely relative to the valve body 26. An elliptical valve plate 38 or other appropriate annular shaped plate is rigidly fixed to the input shaft 34 by a pair of fasteners 40 and closely fitted in the fluid passage 28 for regulating exhaust gas flow through the fluid passage 28. As shown in a fully closed position in FIGS. 1-2, 4, the annular valve plate 38 is aligned to be generally concentric with the fluid passage 28.

The electrical actuator 22 produces the continuously variable output that is directly coupled to the input shaft 34 for fast, accurate and precise control of the butterfly valve 24 and thereby of the exhaust gas flow through the fluid passage 28. The electrical actuator generally includes an electrical input line 42 for receiving electric signals and an output shaft 44 that is driven to a rotational position which is proportionally related to the electric input signals. In the preferred embodiment, the electrical actuator 22 is illustrated as a limited angle torquer (LAT) which converts a 4-20 mA input current to a proportionally related rotary output position of the output shaft 44. As shown in the drawings, the electrical actuator 22 includes an outer casing 46 that contains an inner stator assembly 48, and has a coil assembly 50 connected to the electrical input line 42. The output shaft 44 includes a permanent magnet armature 52 which is responsive to current applied in the coil 50. The electrical actuator 22 also includes a bearing housing 54 fastened to the stator 48. The output shaft 44 is journalled by a pair of steel ball bearings sets 56 in the bearing housing 54, and projects out of the bearing housing 54. In accordance with a particular aspect of the present invention, it is seen that the input and output shafts 34, 44 are coaxially aligned.

In the illustrated embodiment, output shaft 44 includes a spud adaptor 57 (FIG. 2) connected to an end of a main shaft. However, as used herein an output shaft may be a single piece, i.e. where the spud adaptor 57 is unnecessary as its features are integrally formed in shaft 44 or a plurality of components such as illustrated in FIG. 2. Hereinafter, these two configurations will be generically referred to as "output shaft 44" and shall include either configuration.

To accurately control the butterfly valve position, the input and output shafts 34, 44 are rotationally coupled to directly transfer the continuously variable rotational output of the electrical actuator 22 to the butterfly valve 24. In the preferred embodiment, a change in rotary position of the output shaft 44 simultaneously and correspondingly modifies the rotary position of the input shaft 34 and therefore the valve plate 38. Accordingly, a coupling shaft in the form of intermediate coupling tube 58 joins the input and output shafts 34, 44. The coupling tube 58 provides open ends 60, 61 that readily receive, preferably, coaxially opposed shaft ends 63, 64 of the output shaft 44 and input shaft 34, respectively.

Figure 6:
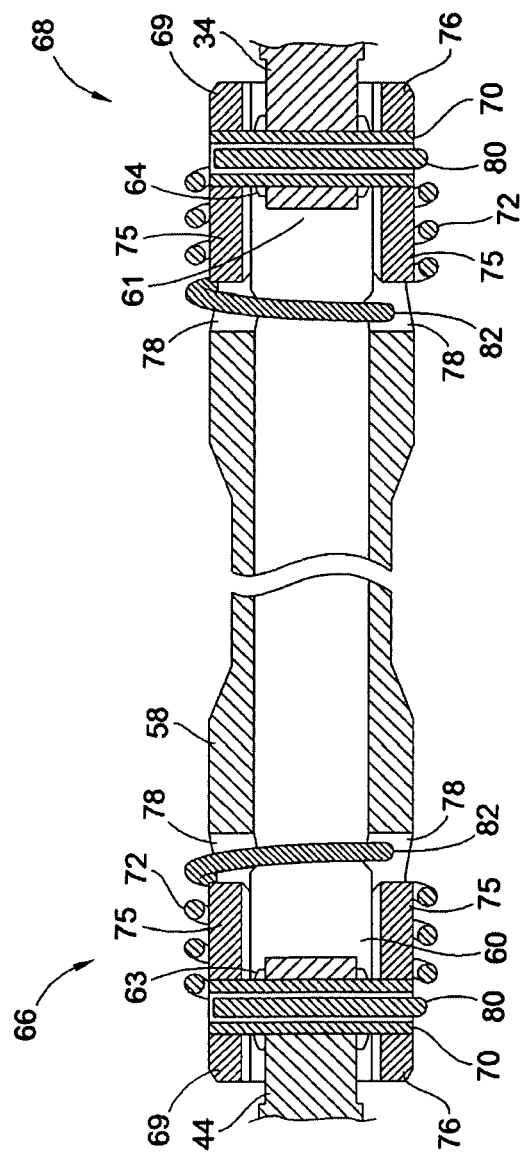
FIG. 6 is a cross-sectional illustration of the drive arrangement of FIG. 5.

To rotationally couple the input and output shafts 34, 44, and referring now to FIGS. 2 and 5-6, the intermediate coupling tube 58 is connected to the input and output shafts 34, 44 by a pair of torsion spring mechanisms generally indicated at 66 and 68. In the embodiment, each torsion spring mechanism includes a yoke 69, roll pin 70, or other rigid radially extending member, and a torsion spring 72. The roll pins 70 secure the yokes 69 to shafts 34, 44 and are pressed in corresponding holes 73 formed in the yoke 69 and holes 74 formed in the ends 63, 64 of the respective shafts 34, 44. The roll pins 70 prevent the yokes 69 from rotating relative to shafts 34, 44. However, other means of securing the yokes 69 to shafts 34, 44 could be implemented such as a keying arrangement to prevent rotation and a screw could be used to axially secure the components together.

Figure 7:
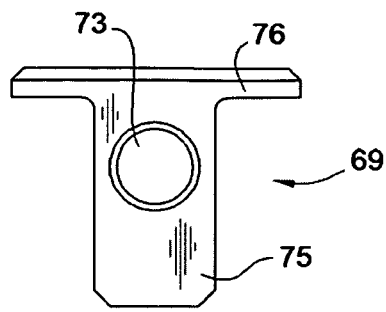
FIG. 7 is a top view of a yoke of the drive arrangement of FIG. 4.
Figure 8:
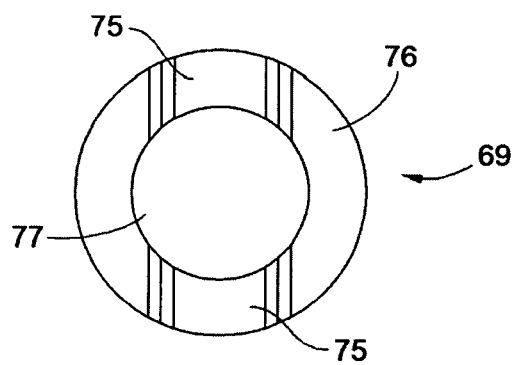
FIG. 8 is an end view of the yoke of FIG. 7.
Figure 9:
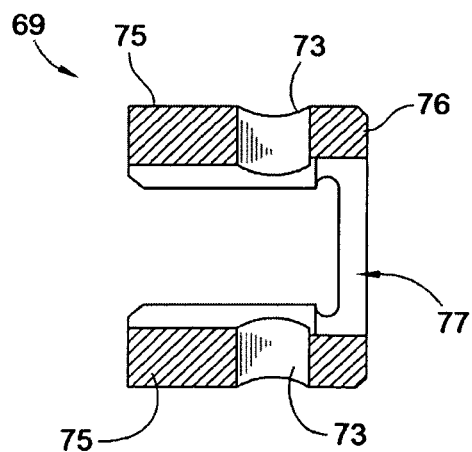
FIG. 9 is a cross-sectional side view of the yoke of FIG. 7.

With reference to FIGS. 7-9, each yoke 69 includes a pair of tangs 75 that extend axially from an annular head 76. The annular head 76 defines hole 77 through which ends 63, 64 of shafts 34, 44 pass when mounting the yokes 69 to the shafts 33, 44. The tangs 75 are angularly spaced apart forming axially extending slots therebetween. In the illustrated embodiment, the tangs 75 define an inner diameter that is less than the diameter of hole 77.

Referring to FIGS. 2 and 4-6, tangs 75 slide axially within axially extending slots 78 formed at the open ends 60, 61 of the coupling tube 58 angularly interlocking the yokes 69 with the coupling tube 58. This sliding arrangement provides an axial degree of freedom between the yokes 69 and the coupling shaft 58. Further, the tangs 75 are preferably narrower than the slots 78 such that angular clearance is provided between slots 78 and the tangs 75 to assist easier installation providing a limited rotational degree of freedom between the yokes 69 and coupling shaft 58.

Returning to FIGS. 2 and 4-6, in one embodiment, roll pins 70 have a snug fit within the holes 73, 74 formed in the yoke 69 and ends 63, 64 preventing any clearance, and consequently movement, therebetween. This arrangement prevents wear on the components, and particularly roll pin 70. This also provides an area contact between the roll pins 70 and the yokes 69 and shafts 34, 44.

The interlocking arrangement of the yokes 69 and the coupling tube 58 provides an area contact. More particularly, the one of the sides forming slots 78 contacts the sides of tangs 75. In this arrangement, a large contact area of the two components interact with one another, rather than a line contact if the coupling tube 58 directly engaged roll pins 70.

Figure 10:
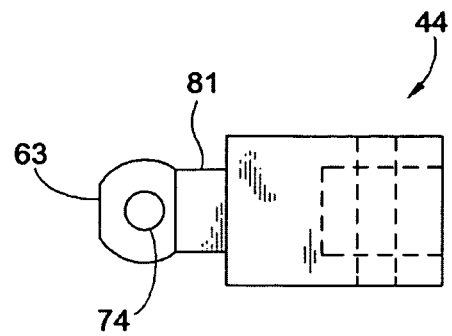
FIG. 10 is a side view illustration of a spud adapter embodiment of an output shaft as illustrated in the drive arrangement of FIG. 4.
Figure 11:
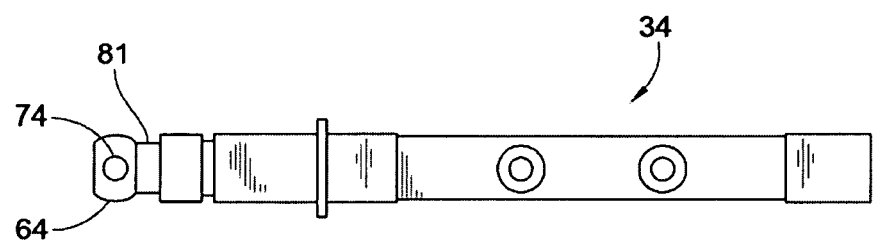
FIG. 11 is a top view illustration of an input shaft of the drive arrangement of FIG. 4.
Figure 12:
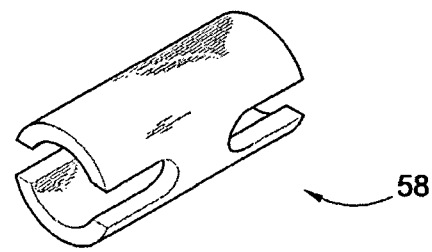
FIG. 12 is a perspective illustration of an embodiment of a coupling shaft for use in the drive arrangement of FIG. 4.

In preferred embodiments, ends 63, 64 of shafts 34, 44 are rounded and more preferably generally spherical (see for example FIGS. 10 and 11). The inner diameter of the cooperating open ends 60, 61 of the coupling tube 58 are preferably designed such that the open ends 60, 61 locate on the outer diameter of the spherical ends 63, 64. The inner diameter of the open ends 60, 61 is preferably no greater than 5% greater than the outer diameter of the spherical ends 63, 64. More preferably, the inner diameter of the open ends 60, 61 is between about 1% and 2% greater than the outer diameter of the spherical ends 63, 64. The inner diameter formed between the inner surface of tangs 75 of yokes 69 is preferably equal to the inner diameter of open ends 60, 61 and, therefore, has the same relative diametrical size compared to the outer diameter of ends 63, 64.

Hole 74 of the ends 63, 64 is preferably centered on the diameter of the spherical ends 63, 64. As such, the roll pins 70 pass through the center of the spherical portion of ends 63, 64. In this configuration, the yokes 69, and a corresponding coupling tube 58, can pivot through a limited angle of freedom relative to the ends 63, 64 about an axis defined by the roll pins 70. As such, the spherical shape of ends 63, 64 acts as a pivot point for yokes 62 and shaft 58. This provides a pivotal degree of freedom between a yoke 69 and the end 63, 64 to which it is axially secured.

As is illustrated in FIGS. 10 and 11, ends 63, 64 include an extension portion 81 separating the spherical portion from the rest of the body of shafts 34, 44. This extension portion 81 has a reduced diameter relative to the spherical portion and provides a relief zone in which the heads 76 of the yokes 69 are or may be accommodated when the yokes 69 pivot relative to the ends 63, 64 about roll pins 70. This pivoting may occur due to thermal expansion or slight mis-alignment of the input and output shafts 34, 44 during assembly.

In a preferred embodiment, the spherical portion of ends 63, 64 are machined directly into shafts 34, 44. In alternative embodiments, the spherical portion may be a separate component that is mounted onto the extension portion 81. More particularly, the spherical portion may have a central bore transverse to hole 74 through which the extension portion 81 of the shafts 34, 44 extends permitting the spherical portion to be mounted to the extension portion 81.

While it was indicated above that it is preferred to have shaft ends 63, 64 that are coaxial with one another, it is a benefit of the present invention that the yokes 69 and consequently tube 58 can pivot relative to the shaft ends 63, 64 and the tube 58 can move axially relative to the shaft ends 63, 64 to compensate for slight mis-alignment.

During assembly of the torsion spring mechanisms 66, 68, Each torsion spring 72 is fitted over the interlocking portions of the coupling tube 58 and yokes 69 and has an axially extending outward end 80 which cradles and engages a roll pin 70 through a tangential contact point or line. Each torsion spring 72 also includes an inward end 82 that engages the coupling tube 58, in this case the inward ends 82 are bent and fitted into the axial slots 78 of the coupling tube 58. The torsion spring mechanisms 66, 68 prevent rotational backlash between the input shaft 34 and output shaft 44. To provide this, each yoke 69 is loaded between the torsion spring outer end 80 and one edge of an axial slot 78.

To provide direct response without backlash and without rotational hysteresis between the electrical actuator 22 and butterfly valve 24, the torsion springs 72 are preloaded to provide a rotational bias greater than the torque that the electrical actuator 22 and butterfly valve 24 will exert on the coupling tube 58 during normal operation. This prevents rotational hysteresis in the butterfly valve 24 and provides an exact response in the butterfly valve plate 38, which in turn, provides better control over the exhaust flow through the fluid passage 28. This preload also overcomes any angular/torsional initial clearance between the slots 78 and tangs 75 identified previously.

Figure 3:
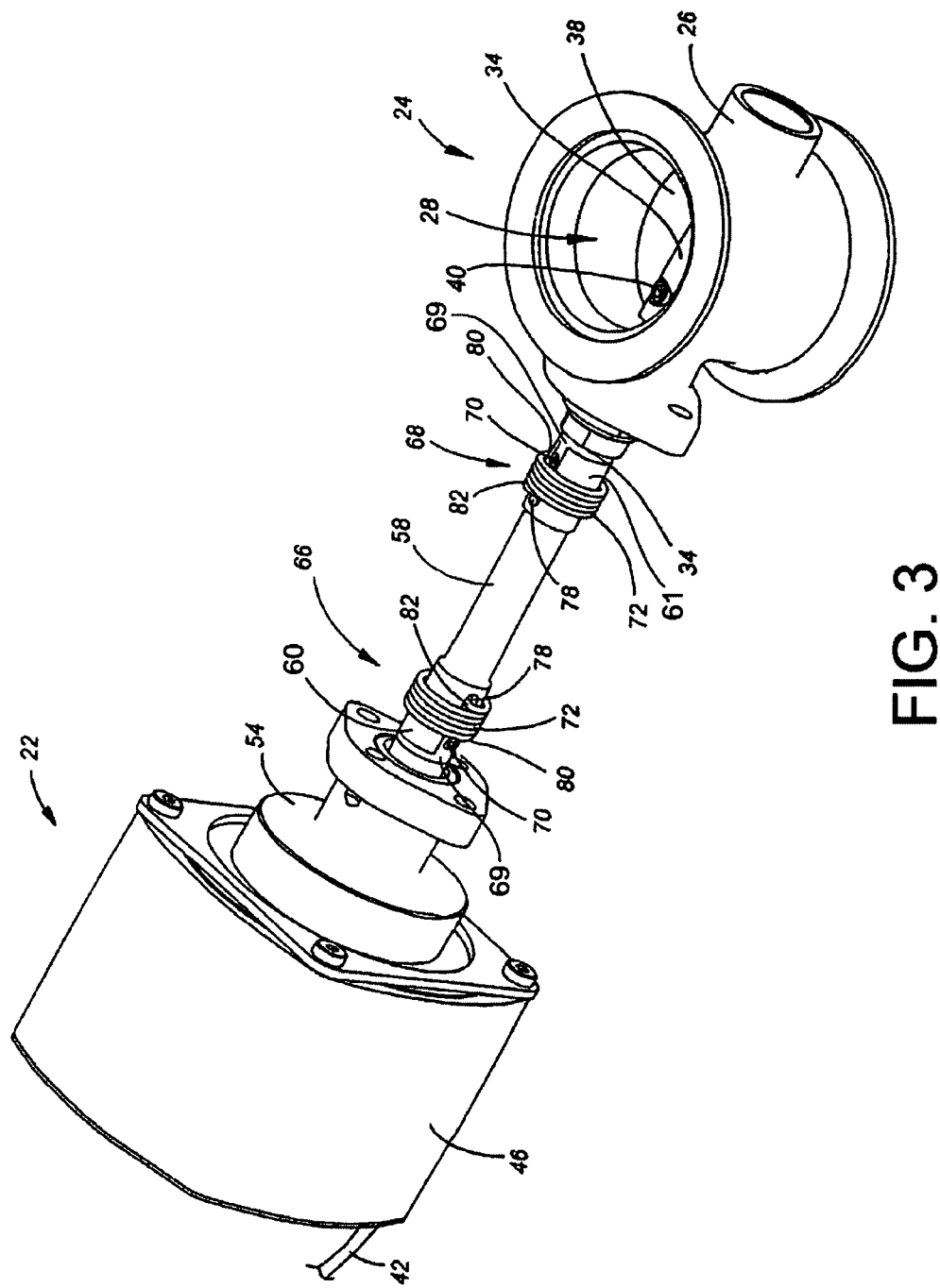
FIG. 3 is a perspective view of the electrically controlled butterfly valve of FIG. 1 with the outer housing tube removed.

In accordance with a feature of the present invention and referring to FIGS. 1 and 2, the electrical actuator 22 and butterfly valve 24 are built into one integral assembly. Accordingly, an outer housing tube 86 fixes the valve body 26 to the bearing housing 54 of the electrical actuator 22 to prevent rotation therebetween. In the preferred embodiment, the outer housing tube 86 contains the intermediate coupling tube 58 and projecting ends 63, 64 of the input and output shafts 34, 44. The outer housing tube 86 is fastened between the electrical actuator 22 and valve body 26 by socket head cap screws 88, or other such suitable fasteners. The housing tube 86 also includes a plurality of access openings 89 in close proximity to the drive receiving/mounting portion 30 of the valve body 26 to allow access for disconnecting and connecting the torsion spring mechanism 68. Although a housing 86 is provided in the preferred embodiment, the outer housing tube 86 could be removed (as shown in FIG. 3) to the extent that the butterfly valve 24 and electrical actuator are rigidly fixed to external components.

In operation, high temperature exhaust gas or other fluid can be continuously applied to the fluid passage 28. The electrical current transmitted through line 42 to the electrical actuator 22 is controlled to selectively position the valve plate 38 as desired. In a preferred embodiment, the electrical actuator 22 is continuously variable so that the valve plate 38 may be selectively positioned and selectively held in any position between the fully open and fully closed positions. The position of the valve plate 38 may be updated as desired so that the valve plate 38 modulates flow. The speed at which flow is modulated depends on the particular application of the butterfly valve 24 and the rate at which the electrical actuator 22 responds to electrical input signals.

In a preferred embodiment, the butterfly valve 24 is adapted to pass exhaust gas or other high temperature fluid that can have a temperature of up to approximately 1400° F., while the electrical actuator 22 has an upper temperature limit of approximately 212° F. before failure or malfunction. In accordance with the invention, the electrical actuator is protected from this adverse environment by limiting heat transfer along the control and mounting mechanism. As shown herein, the drive arrangement (also referred to as a coupling arrangement), which transfers continuously variable rotational output from the electrical actuator 22 to the butterfly valve 24, is broken into separate thermally isolated drive shafts (input and output shafts 34, 44), a coupling tube 58, yokes 69 and/or other thermally isolated components (such as torsion springs). The contact areas between the coupling tube 58 and the drive shafts 34, 44 are limited or insulated by yokes 69 to provide at least one and preferably several thermal barriers which restrict heat transfer therebetween sufficient to prevent thermal damage to the electrical actuator 22 for the particular thermal fluid application. In the preferred embodiment, the inner diameter of the end openings of the coupling tube 58 are sized sufficiently larger (for example up to 5% greater) than the respective outer diameter of the input shaft 34 and output shaft 44 to provide an insulating gap and minimize contact between the coupling tube 58 and the input and output shafts 34, 44. Each insulating gap between the tube 58 and the shafts 34, 44 serves as a primary thermal barrier preventing overheating of the electrical actuator. Moreover, the input and output shafts 34, 44 have only a small end portion slidably fitted into the coupling tube 58 to limit heat transfer therebetween. In the illustrated embodiment, the use of the spherical or rounded ends 63, 64 reduces the contact between the coupling shaft 58 and ends 63, 64 to only a line contact as opposed to area contact if the ends 63, 64 were cylindrical.

Heat restriction and thermal barriers are also provided by the torsion spring mechanisms 66, 68 or other such suitable coupling means that joins the coupling tube 58 to the input and output shafts 34, 44. The torsion spring mechanisms 66, 68 or other coupling means minimizes the metallic contact points and/or metallic cross-sectional metallic areas between the input and output shafts.

One embodiment also uses metal materials, or other durable materials that have low thermal conductivity to further reduce heat transfer. Accordingly, the materials used for the intermediate coupling tube 58, input shaft 34 and outer housing tube 86 are preferably formed of stainless steel material, or other low thermally conductive rigid material. The valve plate 38 may be formed from Inconel type steel which also has heat resistant qualities.

Another aspect of an embodiment includes the use of radially defined compliance slots 90 on the outer housing tube 86, as may be seen best in FIG. 2. Compliance slots 90 are aligned in adjacent rows 92A, 92B, 92C formed in out-of-phase alignment with one another. As seen there are multiple rows 92A, 92B, 92C of compliance slots 90, each row 92A, 92B, 92C being geometrically rotated by 120° or other appropriate angle with respect to adjacent rows 92A, 92B, 92C. These compliance slots 90 serve as thermal resistors because the cross sectional area of the outer housing tube 86 is greatly reduced, while the effective thermal conductive length of the outer housing tube 86 is increased. The access orifices 89 also increase the thermal resistance of the outer housing tube 86.

In practicing an embodiment, the electrical actuator is adapted to mount in bracketing (not shown) while the butterfly valve 24 is mounted on piping conduit. The installation of butterfly valve 24 and electrical actuator are preferably done at room temperature. However, during operation of the electrically controlled butterfly apparatus 20, a significant temperature differential exists between the electrical actuator 22 and the butterfly valve 24. Such temperature differentials can cause axial and angular thermal displacements and misalignments between the butterfly valve 24 and the electrical actuator 22. In addition, the electrically controlled butterfly valve apparatus 20 is adapted for an engine environment (as shown in FIG. 13), and engine vibrations can add additional stress to the axial and angular thermal displacements.

In accordance with the objective of accommodating thermal expansion in the butterfly valve, one embodiment provides a limited range of axial and angular translations of the input shaft 34 relative to the output shaft 44. So that it will be clear, as used herein, angular translations (not to be confused with rotational backlash which the preferred embodiment eliminates) refers to misalignments between the axis of the input shaft 44 and the axis of the output shaft 34. In one embodiment, the end openings and slots 78 of the coupling tube 58 are sized large enough relative to tangs 75 of yokes 69 to permit approximately a 2° angle of angular misalignment between the axes of the input and output shafts 34, 44. Also, the tangs 75 axially ride along the axial slots 78 so that the input shaft 34 can axially translate through a range of positions in the open end 61 without creating axial stresses. Due to the resilient nature of the torsion springs 72, the connection joints between the intermediate coupling tube 58 and the shafts 34, 44 have a range of flexibility to accommodate both axial and angular translations. The out-of-phase compliance slots 90 also provide a limited amount of flexible compliance in the outer housing tube 86 to reduce stresses when small angular and axial displacements occur between the electrical actuator and the butterfly valve 24.

Figure 13:
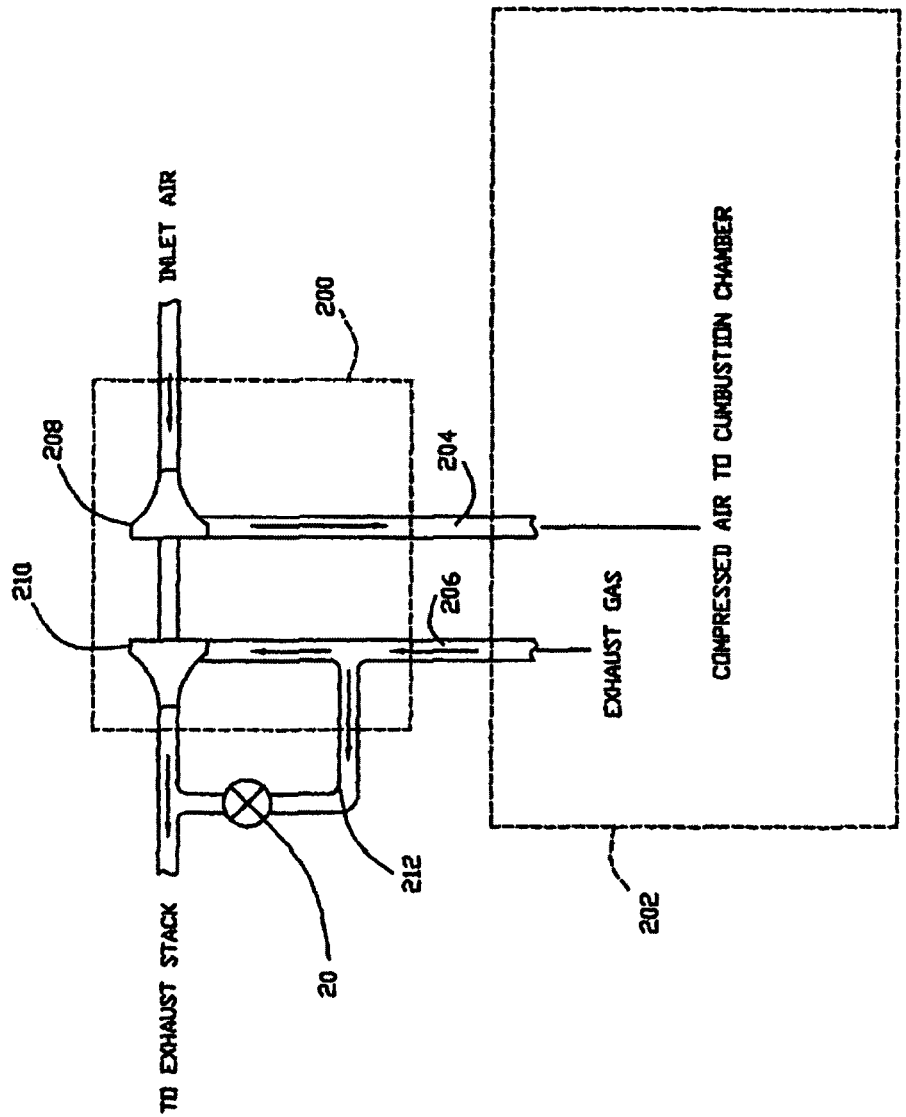
FIG. 13 is a schematic illustration of an electrically controlled butterfly valve incorporated in an engine environment according to a preferred embodiment of the present invention.

Turning to FIG. 13, an exemplary and very significant application of the present invention is schematically illustrated. In accordance with the aim of improving control over engine turbochargers, the electrically actuated butterfly valve apparatus 20 is configured as a wastegate in fluid communication with a turbocharger 200 of an internal combustion engine 202. The internal combustion engine has a compressed air inlet conduit 204 leading to the combustion chambers of the engine 202 and an exhaust gas outlet conduit 206 for discharge. The turbocharger 200 includes a compressor 208 which compresses air to the inlet conduit 204 and a turbine 210 which powers the compressor 208. The turbine 210 is driven by exhaust gas flow through the outlet conduit 206. To control the power of the turbine 210 and thereby the air/fuel ratio in the combustion chambers of the engine 202, there is provided an exhaust gas bypass line 212 which is controlled by the electrically controlled butterfly apparatus 20 that is shown in FIGS. 1-2. The bypass 212 is disposed in fluidic parallel with the outlet conduit 206 to divert exhaust gas flowing to the turbine 210. This controls the operating speed of the compressor 208 and thereby the boost pressure provided by the turbocharger 200 to the engine 202. The exhaust gas flow through the bypass 212 may have temperatures of up to approximately 1400° F. depending upon the particular type of engine.

Although one high temperature application has been shown in FIG. 13, it will be understood that the present invention can be used in a number of applications where thermal isolation of the electrical actuator 22 is needed or where significant range of angular and axial displacements may occur between the electrical actuator 22 and butterfly valve 24. The electrically controlled butterfly valve apparatus 20 has thermal advantages in any application where the fluid being controlled is greater than the temperature limit of the electrical actuator 22, particularly where fluid temperatures through the butterfly approach 100° F. more than the temperature limit of the electrical actuator (which as was mentioned, is limited to about 212° F.), when the possibility of overheating the electrical actuator 22 with only a single shaft becomes very significant. For example, this valve may also be used in controlling compressor 208 bypass and/or turbine 210 bleed operations in internal combustion engines 202. In applications such as controlling compressor 208 bypass, the temperature is much less than 1400° F., although compressed air has a higher temperature than ambient air. In such lower high temperature applications, it will be appreciated to those skilled in the art that the input and output shafts 34, 44 may be directly coupled through one torsion spring mechanism or other rotational coupler thereby eliminating the intermediate coupling tube. The electrically controlled butterfly valve apparatus 20 may also be used in turbine engine applications (not to be confused with turbochargers of internal combustion engines) for modulating fluid flow therein or possibly other such situations which desire an accurate and responsive valve to operate with high temperature fluids.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A drive arrangement for translating rotary movement from an actuator apparatus to a valve member, the drive arrangement comprising:
   an input shaft having a first end portion;
   an output shaft having second end portion:
   a first yoke including an axially extending first tang torsionally secured to the first end portion:
   a second yoke including an axially extending second tang torsionally secured to the second end portion;
   a single piece coupling shaft including a first slot formed in a first end slidably receiving the first tang torsionally coupling the coupling shaft to the first yoke, the coupling shaft including a second slot formed in a second end slidably receiving the second tang torsionally coupling the coupling shaft to the second yoke;
   wherein the coupling shaft has a limited range of axial and angular translation relative to the first and second yokes; and
   wherein the first yoke and first end portion have a single degree of freedom therebetween providing pivotal movement, and wherein the second yoke and second end portion have a single degree of freedom therebetween providing pivotal movement.

2. The drive arrangement of claim 1, wherein the first and second end portions are rounded and the first end portion includes a first extension portion axially offsetting the rounded first end portion from the rest of the input shaft forming an annular groove between the first end portion and the rest of the of the input shaft providing a relief zone in which the yoke can penetrate when pivoted relative to the first end portion and wherein the rounded second end portion includes a second extension portion axially offsetting the rounded second end portion from the rest of the output shaft forming an annular groove between the second end portion and the rest of the of the output shaft providing a relief zone in which the yoke can penetrate when pivoted relative to the first end portion.

3. The drive arrangement of claim 1, wherein the coupling shaft has a limited range of pivotal movement relative to the input and output shafts via the first and second yokes, respectively.

4. A drive arrangement for translating rotary movement from an actuator apparatus to a valve member, the drive arrangement comprising:
   an input shaft having a first end portion;
   an output shaft having second end portion:
   a first yoke including an axially extending first tang torsionally secured to the first end portion;
   a second yoke including an axially extending second tang torsionally secured to the second end portion:
   a single piece coupling shaft including a first slot formed in a first end slidably receiving the first tang torsionally coupling the coupling shaft to the first yoke, the coupling shaft including a second slot formed in a second end slidably receiving the second tang torsionally coupling the coupling shaft to the second yoke; and
   wherein the first and second end portions are rounded and the first and second yokes each include a mounting aperture for receiving the first and second end portions, respectively, the inside diameters of the mounting apertures being at least one percent greater than the outside diameters of the first and second end portions providing a first thermal barrier between the input and output shafts and the first and second yokes, respectively.

5. The drive arrangement of claim 4, wherein the coupling shaft has a limited range of axial and angular translation relative to the first and second yokes.

6. The drive arrangement of claim 4, wherein the width of the first slot is greater than the width of the first tang such that only one side of the first tang contacts one side of the coupling shaft defining the first slot.

7. The drive arrangement of claim 4, further including a torsion mechanism torsionally forcing the first tang into contact with the side of the coupling shaft defining the first slot and substantially preventing all rotational hysteresis between the first yoke and the coupling shaft.

8. A drive arrangement for translating rotary movement from an actuator apparatus to a valve member, the drive arrangement comprising:
   an input shaft having a first end portion:
   an output shaft having second end portion;
   a first yoke including an axially extending first tang torsionally secured to the first end portion;
   a second yoke including an axially extending second tang torsionally secured to the second end portion;
   a single piece coupling shaft including a first slot formed in a first end slidably receiving the first tang torsionally coupling the coupling shaft to the first yoke, the coupling shaft including a second slot formed in a second end slidably receiving the second tang torsionally coupling the coupling shaft to the second yoke; and
   wherein the output shaft includes a main shaft and an adaptor spud connected to the main shaft in a fixed position, the adaptor spud including the first end portion.

9. The drive arrangement of claim 8, wherein the coupling shaft is generally tubular.

10. A drive arrangement for translating rotary movement from an actuator apparatus to a valve member, the drive arrangement comprising:
    an input shaft having a first end portion;
    an output shaft having second end portion;
    a first yoke including an axially extending first torsionally secured to the first end portion;
    a second yoke including an axially extending second tang torsionally secured to the second end portion;
    a single piece coupling shaft including a first slot formed in a first end slidably receiving the first tang torsionally coupling the coupling shaft to the first yoke, the coupling shaft including a second slot formed in a second end slidably receiving the second tang torsionally coupling the coupling shaft to the second yoke; and
    wherein the first and second end portions are rounded, further including a first rigid connecting member extending radially through the first yoke and the rounded first end portion to axially and angularly secure the first yoke to the input shaft and further including a second rigid connecting member extending radially through the second yoke and the rounded second end portion to axially and angularly secure the second yoke to the output shaft.

11. The drive arrangement of claim 10, wherein the first rigid connecting member is aligned with a diameter of the first end portion such that the first yoke pivots relative to the first end portion about an axis defined by the first rigid connecting member and wherein the second rigid connecting member is aligned with a diameter of the second end portion such that the second yoke pivots relative to the second end portion about an axis defined by the second rigid connecting member.

12. A drive arrangement for translating rotary movement from an actuator apparatus to a valve member, the drive arrangement comprising:

an input shaft having a first end portion;

an output shaft having second end portion;

a first yoke including an axially extending first tang torsionally secured to the first end portion;

a second yoke including an axially extending second tang torsionally secured to the second end portion;

a single piece coupling shaft including a first slot formed in a first end slidably receiving the first tang torsionally coupling the coupling shaft to the first yoke, the coupling shaft including a second slot formed in a second end slidably receiving the second tang torsionally coupling the coupling shaft to the second yoke;

wherein the coupling shaft is generally tubular; and further comprising a third tang identical to and angularly spaced from and axially aligned with the first tang, a fourth tang identical to and angularly spaced from and axially aligned with the second tang, a third slot axially aligned and angularly spaced from the first slot, the third slot receiving the third tang, and a fourth slot axially aligned and angularly spaced from the second slot, the fourth slot receiving the fourth tang, the third tang being part of the first yoke, the fourth tang being part of the second yoke, the third and fourth slots being formed in the coupling shaft at opposed ends thereof.

13. A coupling arrangement for coupling an actuator with a flow control valve and providing thermal barriers therebetween, the coupling arrangement comprising;

a yoke including first and second axially extending tangs axially extending from a head portion and angularly coupled to one another by the head portion;

a single piece coupling shaft including first and second axially aligned and angularly spaced slots, the first slot slidably receiving the first tang and the second slot slidably receiving the second tang;

wherein the coupling shaft has a degree of rotational movement and a degree of axial movement relative to the yoke;

further comprising a torsion member rotationally coupling the yoke to the coupling shaft while eliminating substantially all rotational hysteresis between the coupling shaft and the yoke;

wherein the head portion is an annular portion defining a mounting aperture for axially receiving an end of a shaft along a first axis; and wherein the yoke further includes a second aperture having a transverse orientation to the mounting aperture and intersecting the mounting aperture.

14. The coupling arrangement of claim 13, further including a rigid connector extending through the second aperture and radially penetrating the mounting aperture.

15. The coupling arrangement of claim 14, further including a torsion spring preloading the coupling shaft into engagement with the yoke through the degree of rotational movement to a predetermined amount of torque.

* * * * *